(12) United States Patent
Park et al.

(10) Patent No.: US 11,651,556 B2
(45) Date of Patent: May 16, 2023

(54) VIRTUAL EXHIBITION SPACE PROVIDING METHOD FOR EFFICIENT DATA MANAGEMENT

(71) Applicant: DIFT CORPORATION, Seoul (KR)

(72) Inventors: Chi Hyung Park, Seoul (KR); Dong Ree Kim, Hwaseong-si (KR); Nam Hyun Kim, Goyang-si (KR); In Je Cho, Seoul (KR)

(73) Assignee: DIFT CORPORATION, Seoul (KR)

(*) Notice: Subject to any disclaimer, the term of this patent is extended or adjusted under 35 U.S.C. 154(b) by 0 days.

(21) Appl. No.: 17/085,710

(22) Filed: Oct. 30, 2020

(65) Prior Publication Data

US 2021/0090330 A1 Mar. 25, 2021

Related U.S. Application Data

(63) Continuation of application No. PCT/KR2019/001644, filed on Feb. 11, 2019.

(30) Foreign Application Priority Data

May 4, 2018 (KR) .......................... 10-2018-0051906

(51) Int. Cl.
*G06T 19/00* (2011.01)
*H04N 13/275* (2018.01)
*H04L 67/131* (2022.01)

(52) U.S. Cl.
CPC .......... *G06T 19/003* (2013.01); *G06T 19/006* (2013.01); *H04N 13/275* (2018.05);
(Continued)

(58) Field of Classification Search
None
See application file for complete search history.

(56) References Cited

U.S. PATENT DOCUMENTS 5,809,298 A * 9/1998 Nakada ............... H04N 7/17336
2005/0086612 A1 * 4/2005 Gettman ................ G06Q 30/02
715/848
(Continued)

FOREIGN PATENT DOCUMENTS

KR   10-2014-0082610 A   7/2014
KR   1020140145217 A    12/2014
(Continued)

OTHER PUBLICATIONS

Gomes et al. "Creating and Assembling Virtual Exhibitions from Existing X3D Models", Technical Report (Year: 2011).*
(Continued)

*Primary Examiner* — Yingchun He
(74) *Attorney, Agent, or Firm* — Studebaker & Brackett PC

(57) ABSTRACT

Provided is a virtual exhibition space providing method for efficient data management. The method comprises the steps of: displaying, on a screen, a space image in which an exhibition space including multiple wall surfaces is expressed in three dimensions; receiving a first user's selection of a particular wall surface among multiple wall surfaces on the space image; displaying, on a screen, a wall surface image of the particular wall surface, in which the particular wall surface is expressed in two dimensions; receiving a command of the first user which causes at least one work image having a particular size to overlap and be arranged at a particular position on the wall surface image; generating a snapshot image of the particular wall surface in which the at least one work image overlaps and is arranged on the wall surface image; and transmitting, to a server, identification information of the particular wall surface, the snapshot image, and the at least one work image.

19 Claims, 13 Drawing Sheets

(52) U.S. Cl.
CPC .... *G06T 2200/24* (2013.01); *G06T 2219/024* (2013.01); *H04L 67/131* (2022.05)

(56) References Cited

U.S. PATENT DOCUMENTS

2009/0040152 A1* 2/2009 Scheibe ............... G06F 3/1446
    345/82
2013/0271456 A1* 10/2013 Haswell ................. G06T 17/00
    345/420

FOREIGN PATENT DOCUMENTS

| KR | 10-2015-0113246 | A | | 10/2015 | | |
|---|---|---|---|---|---|---|
| KR | 10-1647371 | B1 | | 8/2016 | | |
| KR | 10-2017-0038793 | A | | 4/2017 | | |
| KR | 10-2017-0051019 | A | | 5/2017 | | |
| KR | 10-2017-0107581 | A | | 9/2017 | | |
| KR | 20170107581 | A | * | 9/2017 | ............. | G06Q 30/06 |

OTHER PUBLICATIONS

International Search Report issued in PCT/KR2019/001644; dated May 24, 2019.

* cited by examiner

VIRTUAL EXHIBITION SPACE PROVIDING METHOD FOR EFFICIENT DATA MANAGEMENT

CROSS-REFERENCE TO RELATED APPLICATIONS

The present application is a continuation of International Patent Application No. PCT/KR2019/001644, filed on Feb. 11, 2019, which is based upon and claims the benefit of priority to Korean Patent Application No. 10-2018-0051906 filed on May 4, 2018. The disclosures of the above-listed applications are hereby incorporated by reference herein in their entirety.

BACKGROUND

Embodiments of the inventive concept described herein relate to a virtual exhibition space, and more particularly, relate to a virtual exhibition space providing method for efficient data management.

Recently, with the development of information communication technology, a virtual gallery service has been provided. As an example, one virtual gallery service is a flat service of arranging two-dimensional (2D) work images on a 2D wall surface image, another virtual gallery service is served by configuring 3D graphics of a virtual gallery using a 3D engine, and another virtual gallery service is served such that users view and experience works exhibited on a virtual reality (VR) gallery space.

A conventional flat gallery service has a disadvantage incapable of providing a stereoscopic gallery service. A gallery service using the 3D engine or a VR technology takes a long time because there are a considerable size of data and a considerable number of data and is involved in damage of work content. A user terminal for using the gallery service requires high performance.

SUMMARY

Embodiments of the inventive concept provide a virtual exhibition space providing method for reducing a load of a server which stores and processes a large scale of data in a virtual exhibition space providing service.

Embodiments of the inventive concept provide a virtual exhibition space providing method for reducing a time spent to input and transmit data when registering a work for exhibition in a virtual exhibition space providing service.

Embodiments of the inventive concept provide a virtual exhibition space providing method for reducing a loading time a user feels when the user views a work exhibited in a virtual exhibition space providing service.

The technical problems to be solved by the inventive concept are not limited to the aforementioned problems, and any other technical problems not mentioned herein will be clearly understood from the following description by those skilled in the art to which the inventive concept pertains.

According to an exemplary embodiment, a virtual exhibition space providing method may include displaying a space image, in which an exhibition space including a plurality of wall surfaces is expressed in three dimensions, on a screen, receiving a selection of a first user for a specific wall surface among the plurality of wall surfaces on the space image, displaying a wall surface image of the specific wall surface, the wall surface image being where the specific wall surface is expressed in two dimensions, on the screen, receiving a command of the first user to overlay and arrange one or more work images at a specific size at a specific location on the wall surface image, generating a snapshot image of the specific wall surface, the snapshot image being where the one or more work images are overlapped and arranged on the wall surface image, and transmitting identification information of the specific wall surface, the snapshot image, and the one or more work images to a server.

According to an exemplary embodiment, a virtual exhibition space providing method may include preparing for a space image in which an exhibition space including a plurality of wall surfaces is expressed in three dimensions, receiving identification information of a specific wall surface among the plurality of wall surfaces on the space image and a snapshot image of the specific wall surface, the snapshot image being where the specific wall surface is expressed in two dimensions and where one or more works are arranged and expressed at a specific size at a specific location on the specific wall surface, generating an exhibition image by overlapping and arranging the snapshot image on the specific wall surface of the space image using a scale against the exhibition space of the specific wall surface on the space image corresponding to the identification information of the specific wall surface, a slope value of the specific wall surface on the space image, and the snapshot image to follow a stereoscopic element of the space image, and displaying the exhibition image on a screen.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
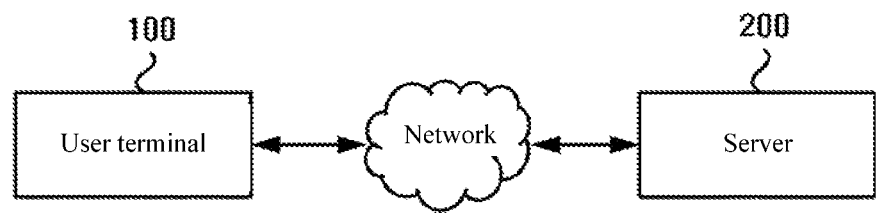
FIG. 1 is a block diagram schematically illustrating an environment to which a virtual exhibition space providing service is applied.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other elements other than stated elements but do not exclude presence of additional elements. Like reference numerals designate like elements throughout the specification, and the term "and/or" may include each of stated elements and one or more combinations of the stated elements. The terms such as "first" and "second" are used to describe various elements, but it is obvious that such elements are not restricted to the above terms. The above terms are used only to distinguish one element from the other. Thus, it is obvious that a first element described hereinafter may be a second element within the technical scope of the inventive concept.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Spatially relative terms, such as "below", "beneath", "lower", "above", "upper", and the like, may be used herein to describe the relationship of one component to another component as illustrated in the figures. It will be understood that the spatially relative terms are intended to encompass different orientations of components in use or operation, in addition to the orientation depicted in the figures. For example, when the component in the figures is turned over, components described as "below" or "beneath" other components would then be oriented "above" the other components. Thus, the exemplary term "below" may encompass both an orientation of above and below. The component may be otherwise oriented, and the spatially relative descriptors used herein may be spatially interpreted according to orientation accordingly.

Hereinafter, an embodiment of the inventive concept will be described in detail with reference to the accompanying drawings.

The "2.5 dimensions" in the specification may refer to describing and expressing an object on a two-dimensional (2D) plane in the form of two dimensions, and the "2.5 dimensionalization" in the specification may refer to converting a 2D object into a 2.5D object. The 2.5 dimensions may be based on cognitive illusion of a person.

The "work image" in the specification may include an image of any creative work expressible in the form of a photo, a picture, and the other images as creative works by an artist.

The "virtual exhibition space" in the specification may be a cyberspace which is present on the network, which may be used as the meaning of place capable of reading various data and information about an exhibition image and a work image.

FIG. 1 is a block diagram schematically illustrating an environment to which a virtual exhibition space providing service is applied.

Referring to FIG. 1, a user terminal 100 and a server 200 may be connected to each other over a network. The user terminal 100 and the server 200 may transmit and receive various data and/or information. The network may include a wired or wireless network. A size, topology, a communication scheme, or the like of the network may be transformed and provided in various manners according to an embodiment.

The user terminal 100 may indicate a computer system used by a user. For example, the user terminal 100 may be provided as a mobile computer system such as a smartphone, a tablet, a personal digital assistant (PDA). Alternatively, the user terminal 100 may be provided as a fixed computer system such as a laptop or a desktop. The user terminal 100 is not limited to the above-mentioned examples, which may be provided as any computer system which is connectable with the server 200 over the network and has its display. The user terminal 100 may store and run an application for interworking with the server 200. The application may include various instructions, data, and information.

The server 200 may provide a virtual exhibition space. The server 200 may provide the user terminal 100 with an exhibition image depending on a request from the user terminal 100. The exhibition image may be provided as a stereoscopic image as described below. In some embodiments, the exhibition image may be drawn by linear perspective. Furthermore, the exhibition image may be drawn to have a certain view point and a certain number of vanishing points. Because a detailed description of the linear perspective blurs the gist of the inventive concept, a description thereof will be omitted.

As will be described below, a snapshot may be used to generate a stereoscopic exhibition image. The snapshot image may be an image in which one or more work images are overlapped and arranged on a planar image of a wall surface. The stereoscopic exhibition image may be generated through 2.5 dimensionalization of such a two-dimensional (2D) snapshot image.

Meanwhile, unlike that illustrated in FIG. 1, a plurality of user terminals may be connected with the server 200. One user terminal may be used by a first user, and another user terminal may be used by a second user. The first user may be a manager (e.g., an artist, a curator, a collector, or the like) of a virtual exhibition space, who registers a work image for exhibition as described below. The second user may be a viewer of the virtual exhibition space, who may read and view an exhibition image and a work image as described below. It may be clearly understood that one user may be divided into the first user and the second user at the same time.

Figure 2:
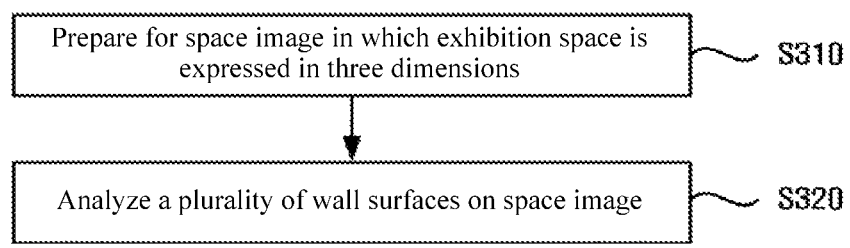
FIG. 2 is a flowchart schematically illustrating a process of setting a space image in a virtual exhibition space providing method according to an embodiment of the inventive concept.

FIG. 2 is a flowchart schematically illustrating a process of setting a space image in a virtual exhibition space providing method according to an embodiment of the inventive concept.

Referring to FIG. 2, in operation S310, a server 200 of FIG. 1 may prepare for a space image on which an exhibition space is expressed in three dimensions. The space image may define a virtual (i.e., non-existent) exhibition space. The space image may be inherent in an application and may be previously stored in a user terminal 100 of FIG. 1.

Figure 3:
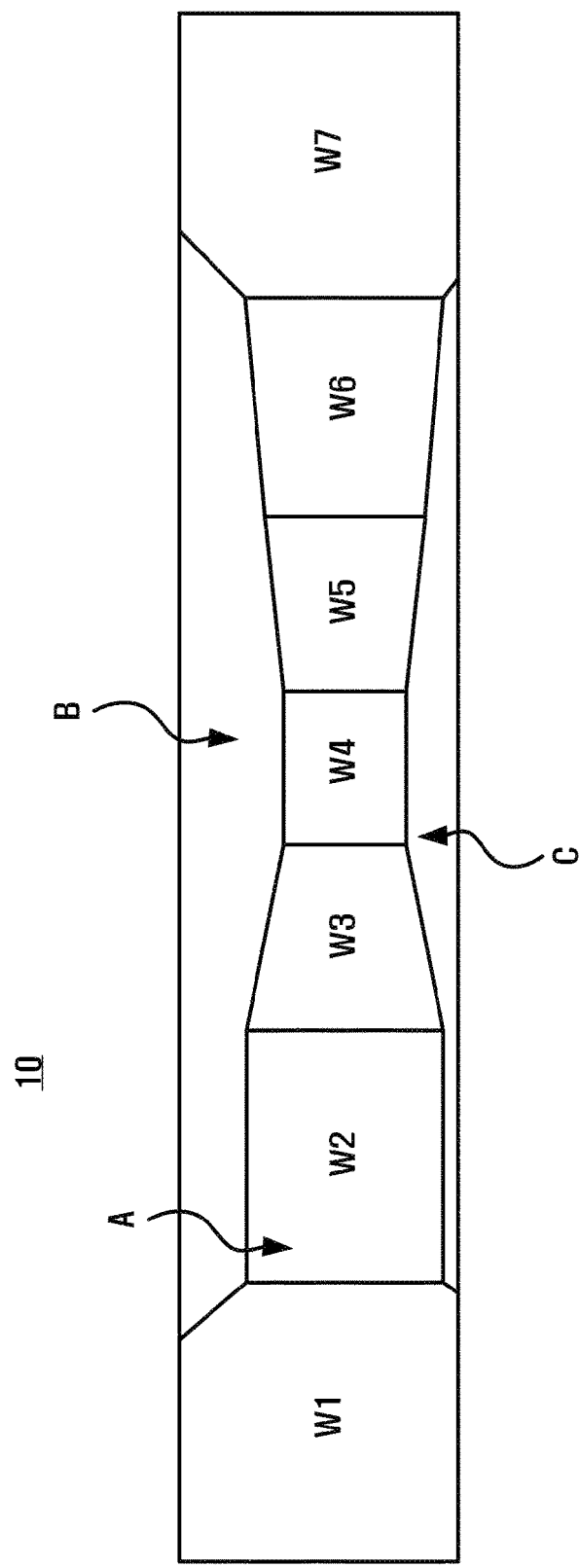
FIG. 3 is a drawing schematically illustrating a space image in which an exhibition space is expressed in three dimensions.

FIG. 3 is a drawing schematically illustrating a space image in which an exhibition space is expressed in three dimensions.

As shown in FIG. 3, in some embodiments, a space image 10 may be drawn by linear perspective. Furthermore, the space image 10 may have a shape where a plurality of one-point perspective or a plurality of two-point perspective are integrated. In other words, the space image 10 may be drawn to have a plurality of view points and one or more vanishing points corresponding to each of the plurality of view points.

An exhibition space may include a plurality of surfaces in the space image 10. Herein, the surfaces may include a plurality of wall surfaces A, a ceiling surface B, and a bottom surface C. In some embodiments, the ceiling surface B may be expressed in a form where the ceiling is omitted and opened. As will be described below, in general, the wall surfaces A may be used for layout and exhibition of a work image, but, in some embodiments, the ceiling surface B or the bottom surface C may be used for the layout and exhibition of the work image. The number of the wall surfaces A may be increased and decreased in various manners according to an embodiment. A layout form of the wall surfaces A may be transformed in various manners according to an embodiment.

Meanwhile, although not clearly illustrated in FIG. 3, in some embodiments, light, shading, a color, a shadow, or the like may be further expressed on the space image 10. Furthermore, things (for interior design) other than a work may be further expressed on the space image 10.

In some embodiments, a rate of each of the wall surfaces A of the exhibition space defined by the space image 10 may be uniformly fixed. In other words, an aspect ratio of the plurality of wall surfaces A may be fixed to the same value. The ratio may be determined in advance. Meanwhile, a size of each of the plurality of wall surfaces A may fail to be uniformly fixed. For example, the ratio of the plurality of wall surfaces A may be 16:9, which may be fixed to an aspect ratio of a general mobile computer system. As a result, as will be described below, when providing a user with a wall surface image or a snapshot image expressed in two dimensions, the image may be displayed to be filled in the entire region of a screen of a user terminal 100 of FIG. 1. Meanwhile, the ratio of the plurality of wall surfaces 10 is not limited to the example.

Figure 4:
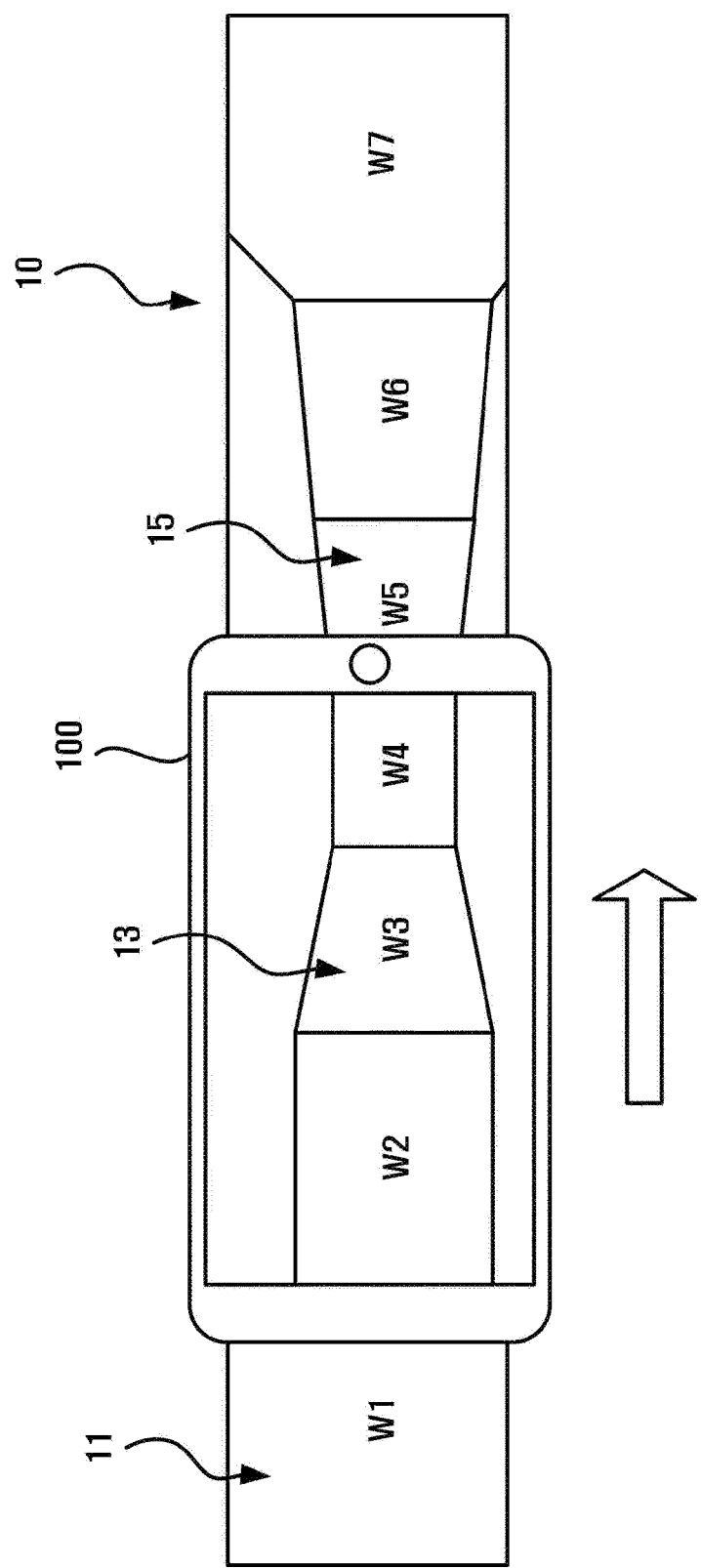
FIG. 4 is a drawing schematically illustrating a case whether a space image is provided to a user via a user terminal.

FIG. 4 is a drawing schematically illustrating a case whether a space image is provided to a user via a user terminal. FIG. 4 illustrates a case whether a user terminal 100 is a smartphone.

As shown in FIG. 4, because a space image 10 has a shape elongated in a horizontal direction, a region capable of being displayed on a screen of the user terminal 100 may be limited. According to a location of a view point of a user in a virtual exhibition space, some wall surfaces (e.g., 13) may be displayed on the screen of the user terminal 100 and other wall surfaces (e.g., 11 and 15) may fail to be displayed on the screen of the user terminal 100. As the location of the view point of the user is moved, the region of the space image 10 displayed on the screen of the user terminal 100 may be changed. The location of the view point of the user may be moved intermittently or continuously. An operation for moving the location of the view point of the user may be performed in various manners.

Meanwhile, like the space image 10, a region capable of being displayed on the screen of the user terminal 100 may be limited in an exhibition image 50 described below.

In some embodiments, the space image 10 may has a shape elongated in a vertical direction.

Referring again to FIG. 2, subsequently, in operation S320, the server 200 may analyze a plurality of wall surfaces on the space image 10. As a result of analyzing the space image 10, the server 200 may obtain scales of the plurality of wall surfaces of the space image 10 and may obtain slope values of the plurality of wall surfaces. Herein, the obtained scale and the obtained slope value of each wall surface may be used to adjust a snapshot image described below.

Figure 5:
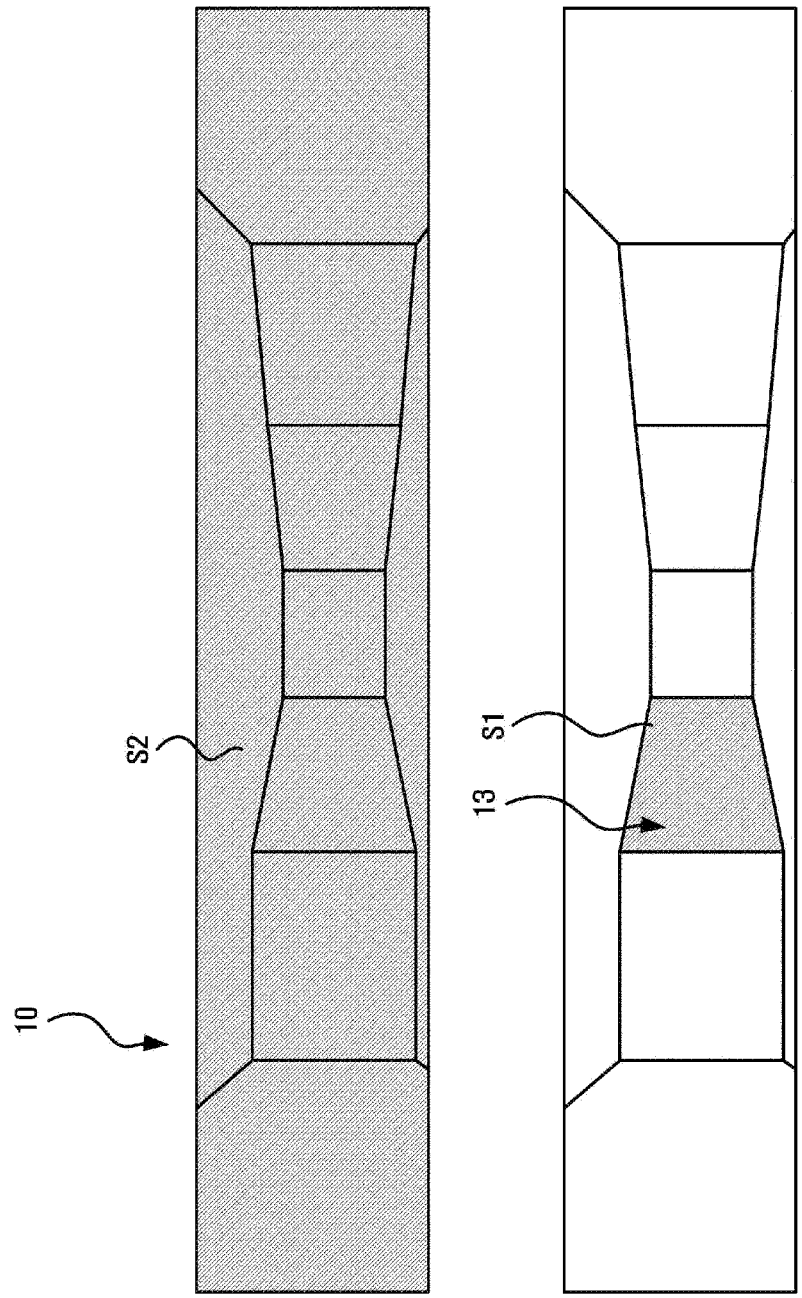
FIGS. 5 and 6 are drawings schematically illustrating analyzing scales and slope values of a plurality of walls.
Figure 6:
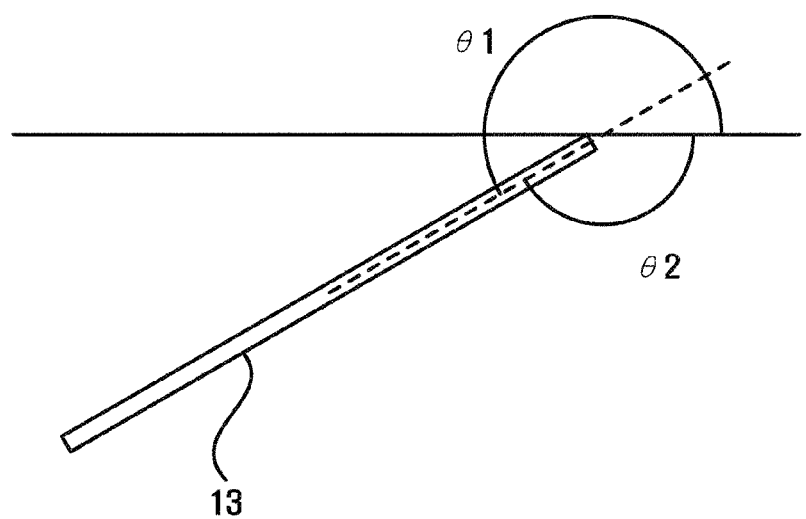

FIGS. 5 and 6 are drawings schematically illustrating scales and slope values of a plurality of walls. FIGS. 5 and 6 illustrate a case where a scale and a slope value of a specific wall surface 13 are analyzed.

Referring to FIG. 5, the scale may refer to the ratio of a wall surface to an exhibition space. In other words, the scale may refer to the ratio (S1:S2) of an area S1 of each wall surface 13 to the entire area S2 of the exhibition space expressed on a space image 10.

Referring to FIG. 6, assuming that a view point of a user is located in front of each wall surface 13 in the space image, the slope value may indicate a degree to which each wall surface 13 is sloped in a clockwise direction or a counter-clockwise direction on a plane. A server 200 of FIG. 1 may obtain coordinates of four corners of the plurality of wall surfaces 13 of the space image and may obtain slope values of the plurality of wall surfaces 13 based on a fixed ratio (e.g., 16:9) of the plurality of wall surfaces 13 and the coordinates of the four corners of the plurality of wall surfaces 13.

FIG. 6 illustrates an appearance (e.g., a plan view) where a specific wall surface 13 is seen on a plane in a virtual exhibition space. The server 200 may obtain an angle of θ1 or θ2 shown in FIG. 6.

Figure 7:
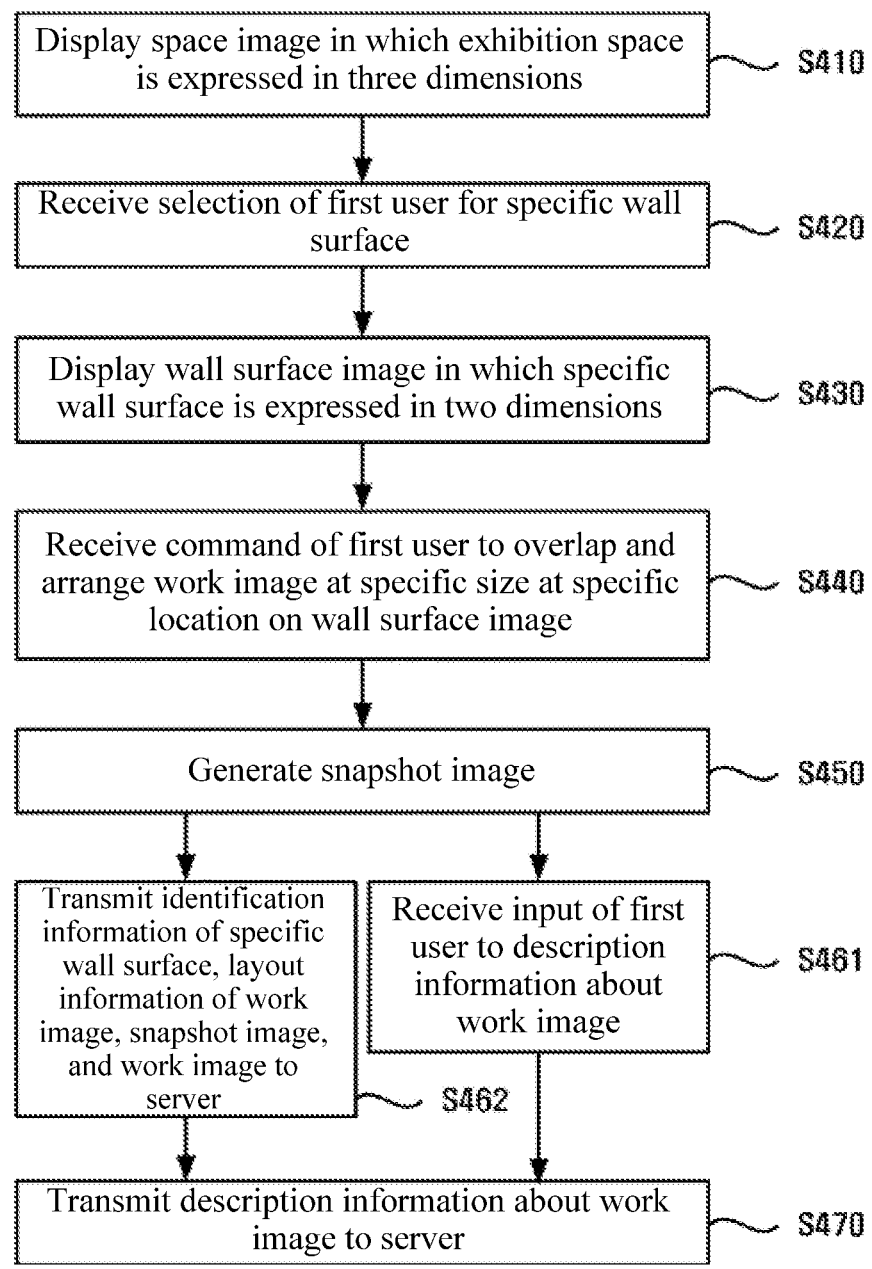
FIG. 7 is a flowchart schematically illustrating a process of registering a work in a virtual exhibition space providing method according to an embodiment of the inventive concept.

FIG. 7 is a flowchart schematically illustrating a process of registering a work in a virtual exhibition space providing method according to an embodiment of the inventive concept.

Referring to FIG. 7, in operation S410, a user terminal 100 of FIG. 1 may display a space image 10 in which an exhibition space is expressed in three dimensions on its screen. The space image 10 may be provided for each exhibition space. A first user may select a specific exhibition space among a plurality of exhibition spaces, and the user terminal 100 may display the space image 10, in which the selected exhibition space is expressed, on the screen.

In operation S420, the user terminal 100 may receive a selection of the first user for a specific wall surface among a plurality of wall surfaces on the space image 10. In operation S430, the user terminal 100 may display a wall surface image of the specific wall surface, in which the specific wall surface is expressed in two dimensions, on the screen. Subsequently, the user terminal 100 may receive a command of the first user to overlay and arrange one or more work images at a specific size at a specific location on the wall surface image. The user terminal 100 may obtain layout information of the one or more work images, including the specific location and the specific size.

Figure 8:
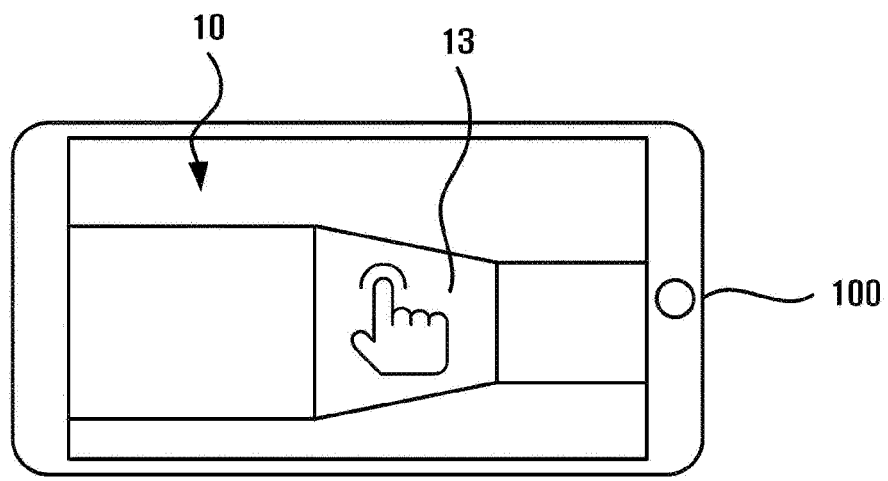
FIGS. 8 and 9 are drawings schematically illustrating arranging work images on a wall surface image of a specific wall surface.
Figure 9:
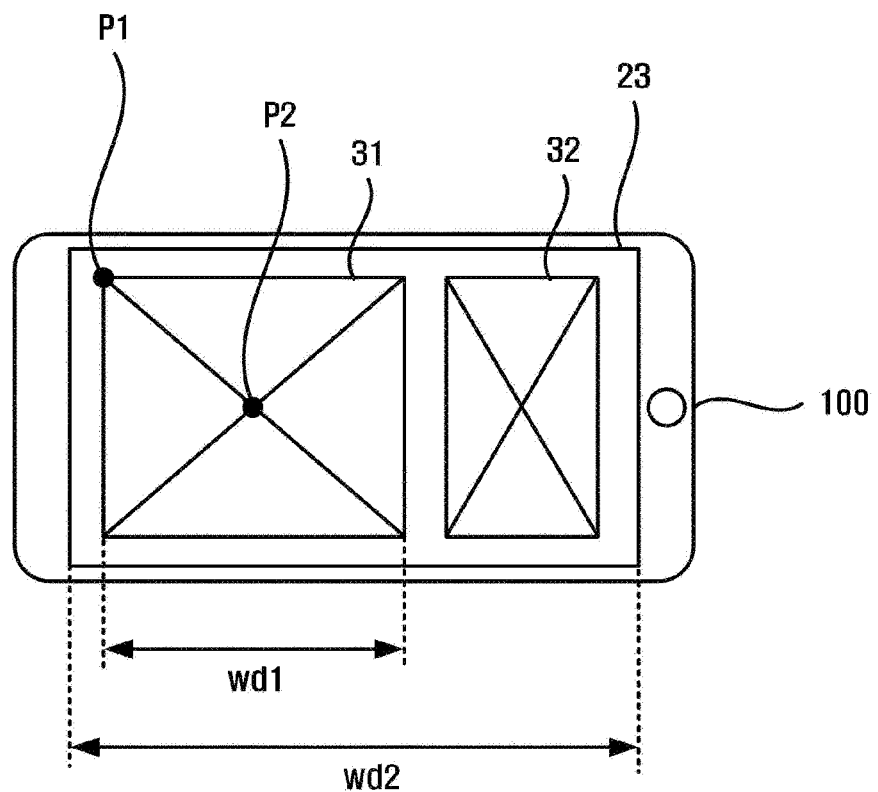

FIGS. 8 and 9 are drawings schematically illustrating arranging work images on a wall surface image of a specific wall surface. FIGS. 8 and 9 illustrate a case whether a user terminal 100 is a smartphone.

Referring to FIG. 8, the user terminal 100 may display a space image 10 on its screen, and a first user may select a specific wall surface 13 among a plurality of wall surfaces on the space image 10 in such a manner as to perform touch.

Referring to FIG. 9, the user terminal 100 may display a wall surface image 23, in which the specific wall surface 13 is expressed in two dimensions, on the screen. The wall surface image 23 may express a wall surface in a state where a work is not disposed. In some embodiments, the wall surface image 23 may be displayed on the entire region of the screen of the user terminal 100. The first user may select one or more work images 31 and 32 stored in the user terminal 100, a cloud storage, or the like and may overlap and arrange the one or more selected work images 31 and 32 on the wall surface image 23. The first user may adjust the one or more work images 31 and 32 to a specific size and may arrange the one or more adjusted work images 31 and 32 into a specific location. In FIG. 9, the two work images 31 and 32 are shown, but one work image or three or more work images may be arranged. When the user terminal 100 is a smartphone, a command of the first user for arranging the one or more work images 31 and 32 may be provided as a touch or a specific gesture. Furthermore, the command of the first user may include one or more of movement, rotation, zoom-in, and zoom-out of the one or more work images 31 and 32.

In some embodiments, a location of the work image 31 may be defined by coordinates of one or more certain corners P1 of the work image 31 or coordinates of the center P2. Herein, the coordinates may be defined by a relative relationship with respect to a specific wall surface on which the work image 31 is disposed (i.e., a coordinate system of the specific wall surface). For example, coordinates of a certain corner of the specific wall surface may be defined as (0. 0). In some embodiments, a size of the wall surface 31 may be defined by the ratio (wd1:wd2) of a width wd1 of each work image 31 to the entire width wd2 of the specific wall surface. However, the manner which defines the location and size of the work image 31 is not limited thereto.

Subsequently, in operation S450, the user terminal 100 may generate a snapshot image of the specific wall surface, in which one or more work images are overlapped and arranged on the wall image 23. In other words, the user terminal 100 may generate the snapshot image by capturing a wall surface image in which the one or more work images are arranged. As will be described below, the snapshot image may be used for the purpose of reducing a load time a user feels by temporarily displaying a work image or the like before receiving and loading the work image or the like from the server 200. In some embodiments, quality of the snapshot image may be preset and may be lower than that of a work image. This is to reduce a size of data and reduce a loading time. In some embodiments, the snapshot image may be generated only for a wall surface on which a work is disposed.

Subsequently, in operation S461, the user terminal 100 may receive an input of the first user to description information about the work image. The description information about the work image may include, for example, but is not limited to, a title or introduction of a work, a name of an author, or the like. At the same time as operation S461, in operation S462, the user terminal 100 may transmit identification information of the specific wall surface, layout information of the one or more work images 31 and 32, a snapshot image 43, and the one or more work images 31 and 32 to the server 200. Subsequently, when the input of the first user to the description information about the one or more work images is completed, in operation S470, the user terminal 100 may transmit the description information about the one or more work images to the server 200. In some embodiments, one or more of the identification information of the specific wall surface, the layout information of the one or more work images 31 and 32, the snapshot image 43, and the one or more work images 31 and 32, which are first transmitted, and the description information about the one or more work images 31 and 32, which is transmitted later, may be mapped and stored in the server 200.

Figure 10:
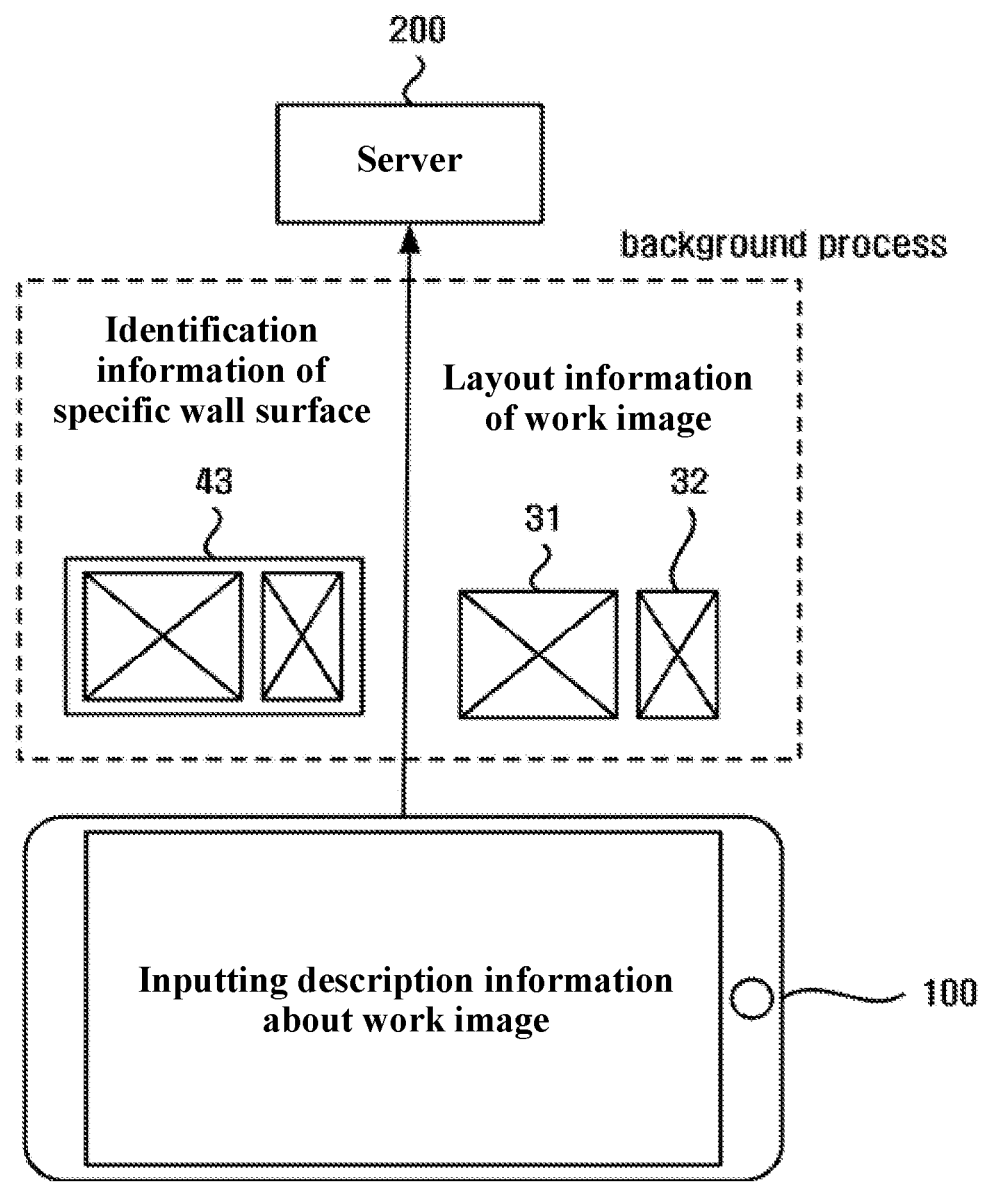
FIG. 10 is a drawing schematically illustrating transmitting a snapshot image and a work image in a background process.

FIG. 10 is a drawing schematically illustrating transmitting a snapshot image and a work image in a background process.

Referring to FIG. 10, transmission of a snapshot image, a work image, and the like to a server 200 may be performed in the background process while an input of a first user to description information about one or more work images is received. The background process may be performed not to be recognized by a user without user interaction or interference. The user terminal 100 may fail to transmit media data and text data to the server 200 at the same time like an existing SNS and may transmit a work image and description information about the work image to the server 200 on a non-simultaneous basis, thus reducing a time taken to input and transmit data when a work for exhibition is registered.

Figure 11:
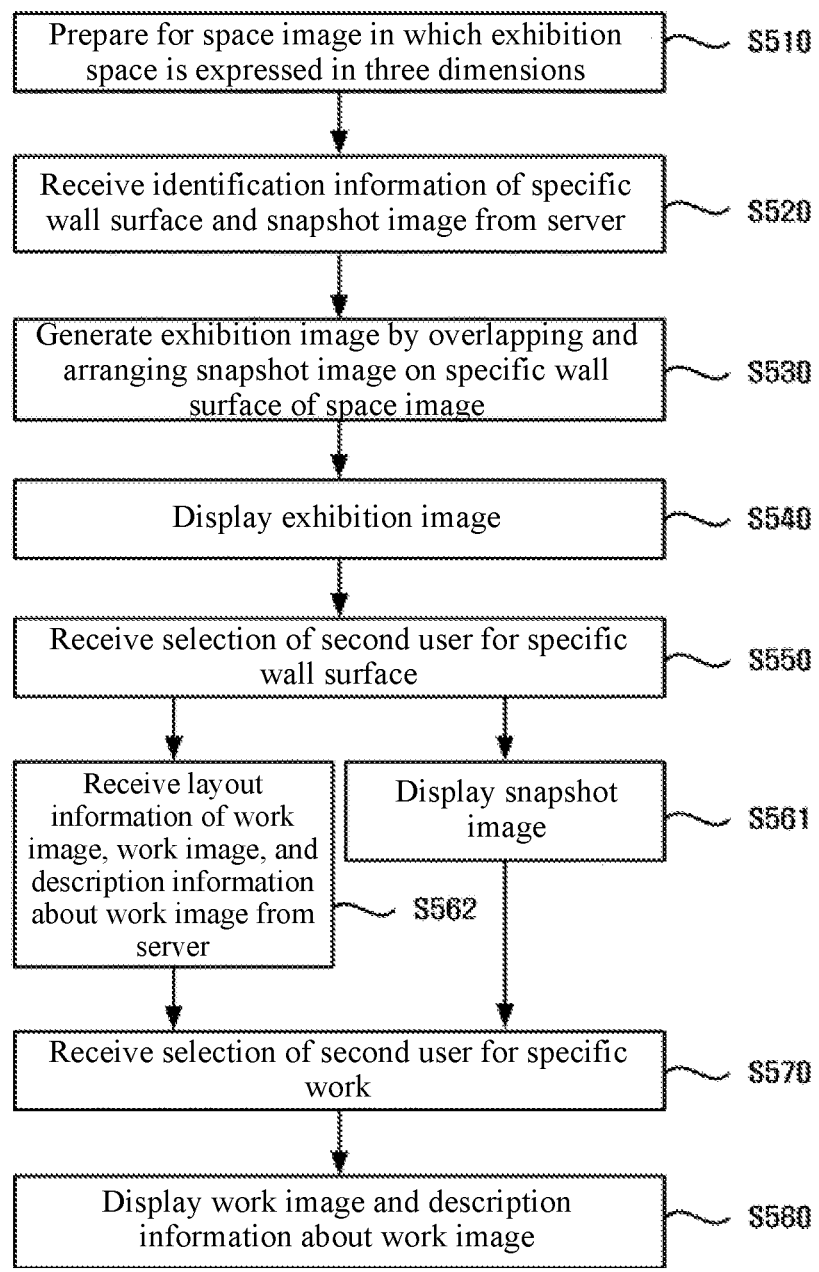
FIG. 11 is a flowchart schematically illustrating a process of viewing a work in a virtual exhibition space providing method according to an embodiment of the inventive concept.

FIG. 11 is a flowchart schematically illustrating a process of viewing a work in a virtual exhibition space providing method according to an embodiment of the inventive concept.

Referring to FIG. 11, in operation S510, a user terminal 100 of FIG. 1 may prepare for a space image 10 in which an exhibition space is expressed in three dimensions. The space image 10 may be provided for each exhibition space. A second user may select a specific exhibition space among a plurality of exhibition spaces, and the user terminal 100 may prepare for the space image 10 in which the selected exhibition space is expressed. The space image 10 may be inherent in an application and may be previously stored in the user terminal 100.

Subsequently, in operation S520, the user terminal 100 may receive identification information of a specific wall surface among a plurality of wall surfaces on the space image 10 and a snapshot image of the specific wall surface, in which the specific wall surface is expressed in two dimensions and in which one or more works are arranged and expressed at a specific size at a specific location on the specific wall surface. In other words, the user terminal 100 may receive the snapshot image of the specific wall surface, which is generated in operation S450. In some embodiments, the user terminal 100 may receive the snapshot image only for a wall surface on which a work image is disposed in a process of registering a work.

Subsequently, in operation S530, the user terminal 100 may adjust the snapshot image using a scale and a slope value of the specific wall surface on the space image 10 corresponding to the identification information of the specific wall surface and the snapshot image to follow a stereoscopic element of the space image 10 and may overlap and arrange the adjusted snapshot image on the specific wall surface of the space image 10 to generate an exhibition image. In operation S540, the user terminal 100 may display the exhibition image on the screen. Herein, "follow the stereoscopic element" may refer to being adjusted by linear perspective to have the same view point and vanishing point as the specific wall surface on the space image 10 unlike original two-dimensional expression. The stereoscopic element may include, for example, a view point or a vanishing point.

Figure 12:
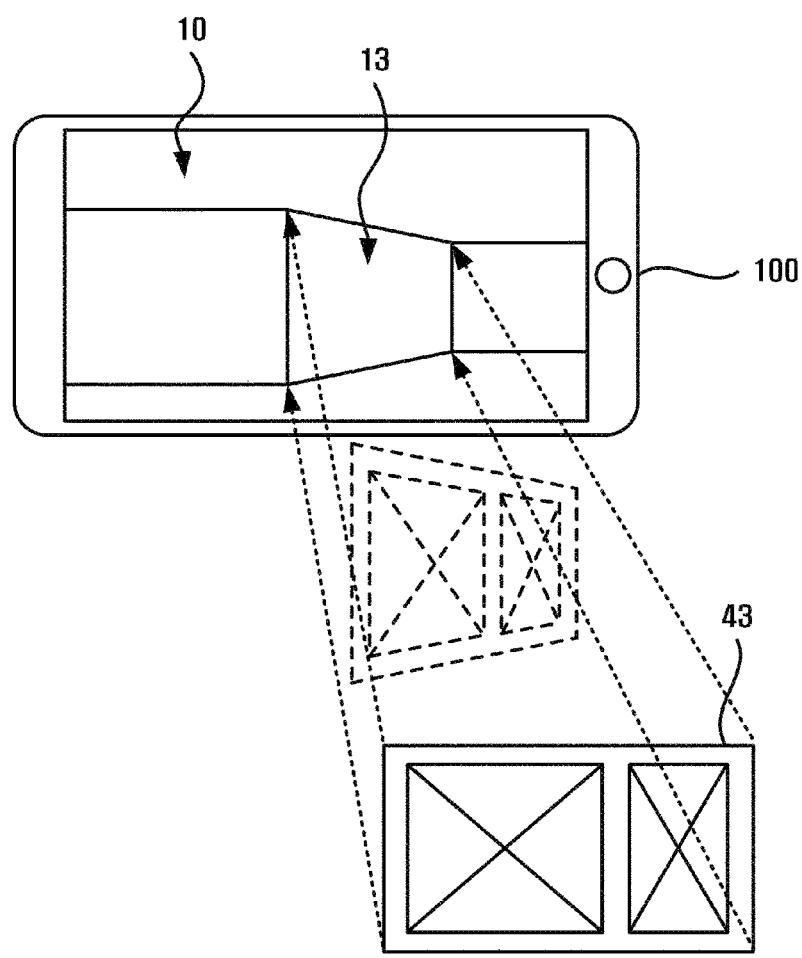
FIGS. 12 and 13 are drawings schematically illustrating overlapping and arranging snapshot images on a space image to generate an exhibition image.
Figure 13:
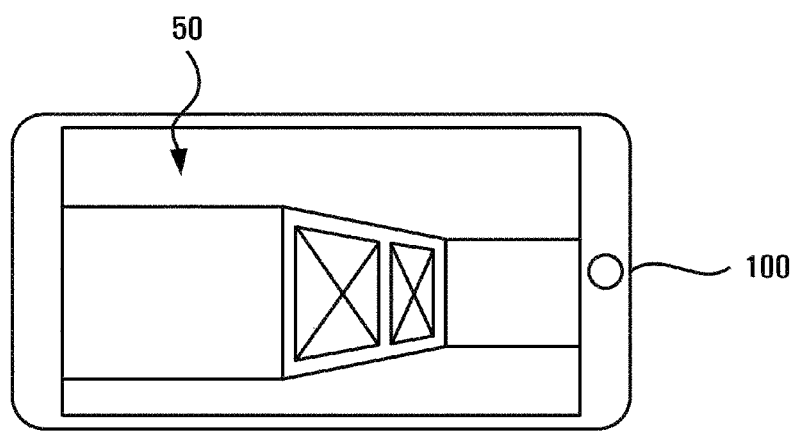

FIGS. 12 and 13 are drawings schematically illustrating overlapping and arranging snapshot images on a space image to generate an exhibition image.

Referring to FIG. 12, a user terminal 100 may prepare for a space image 10. In FIG. 12, it is shown that the user terminal 100 displays the space image 10 on its screen, but this is to help understanding of the inventive concept through comparison of the space image 10 and an exhibition image 50 and the user terminal 100 does not actually display the space image 10 on the screen. Because the space image 10 only expresses an exhibition space, a work image may fail to be disposed on a specific wall surface 13 of the space image 10. The user terminal 100 may fail to receive a work image from a server 200. The user terminal 100 may receive a snapshot image 43 generated in the above-mentioned process of registering the work, rather than the work image, from the server 200. The user terminal 100 may adjust the snapshot image 43 to follow a stereoscopic element of the space image 10 and may overlap and arrange the adjusted snapshot image 43 on the specific wall surface 13 of the space image 10 to generate the exhibition image 50. The exhibition image 50 may be generated in a form where the space image 10 and the snapshot image 43 are integrated. Particularly, when a plurality of work images are arranged on one wall surface, each of the work images may fail to be immediately received from the server 200 and only one snapshot image about the wall surface where the plurality of work images are arranged may be received from the server 200. The snapshot image may be used to generate the exhibition image 50.

Subsequently, in operation S550, the user terminal 100 may receive a selection of a second user for the specific wall surface among the plurality of wall surfaces on the exhibition image 50. Subsequently, in operation S561, the user terminal 100 may display a snapshot image of the specific wall surface, in which the specific wall surface is expressed in two dimensions and in which one or more works are arranged and expressed at a specific size at a specific location on the specific wall surface. At the same time as operation S561, in operation S562, the user terminal 100 may receive layout information of one or more work images 31 and 32, the one or more work images 31 and 32, or description information about the one or more work images 31 and 32 from the server 200. Subsequently, in operation S570, the user terminal 100 may receive a selection of the second user for a specific work among one or more works on the snapshot image.

Subsequently, in operation S580, the user terminal 100 may display a work image (e.g. 31) of the specific work and description information about the work image on the screen using layout information of the work image of the specific work. The layout information of the work image may be used to determine a selection region of the specific work. Furthermore, the layout information of the work image may be used to provide an effect, such as animation, in the process of displaying the work image on the screen. The user may select, zoom in on, and view the work image. As a result, a second user may view each work image in detail without feeling a loading time.

Figure 14:
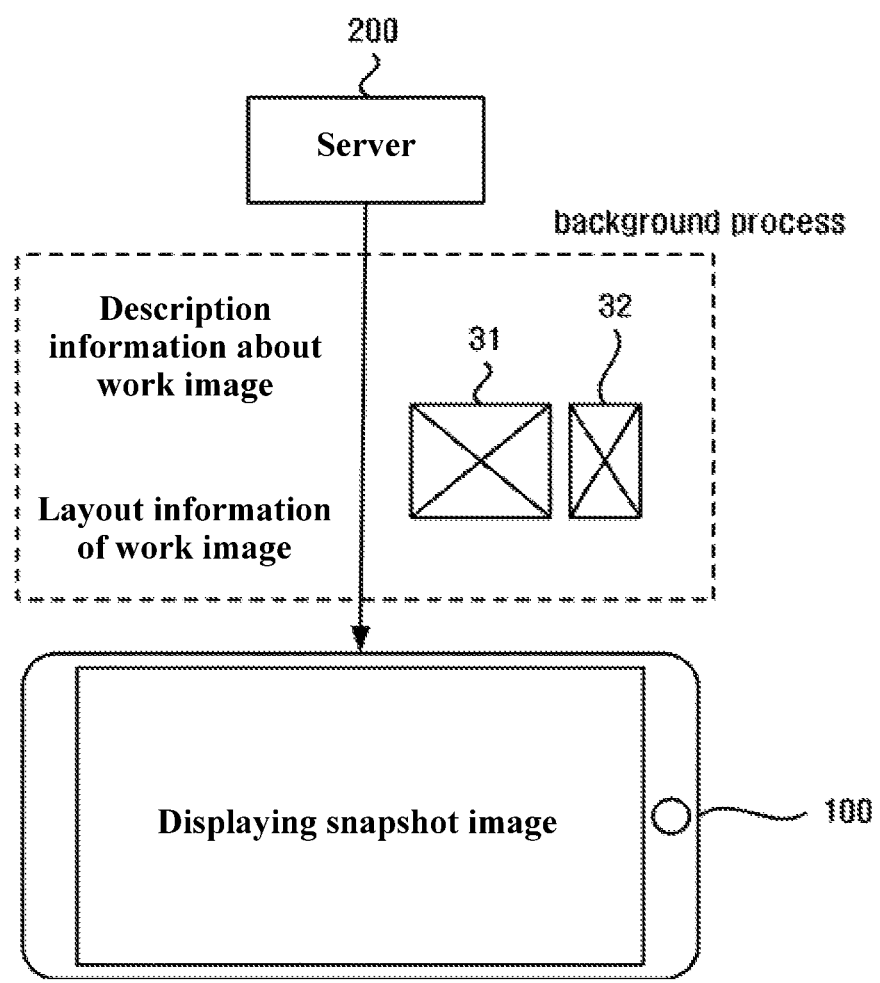
FIG. 14 is a drawing schematically illustrating receiving a work image and description information about the work image in a background process.

FIG. 14 is a drawing schematically illustrating receiving a work image and description information about the work image in a background process.

Referring to FIG. 14, reception of layout information of one or more work images 31 and 32, the one or more work images 31 and 32, and description information about the one or more work images 31 and 32 from a server 200 may be performed in a background process while a snapshot image is displayed on a screen. As described above, the background process may be performed not to be recognized by a user without user interaction or interference. Each work image may fail to be received and loaded from the server 200, and a high-quality (a large amount) of work image may be received from the server 200 through the background process while a user views the entire wall surface after a snapshot image is displayed on the screen. When the user selects a separate work image, the work image may be displayed on the screen, thus reducing a loading time the user feels when the user views the exhibited work.

Figure 15A:
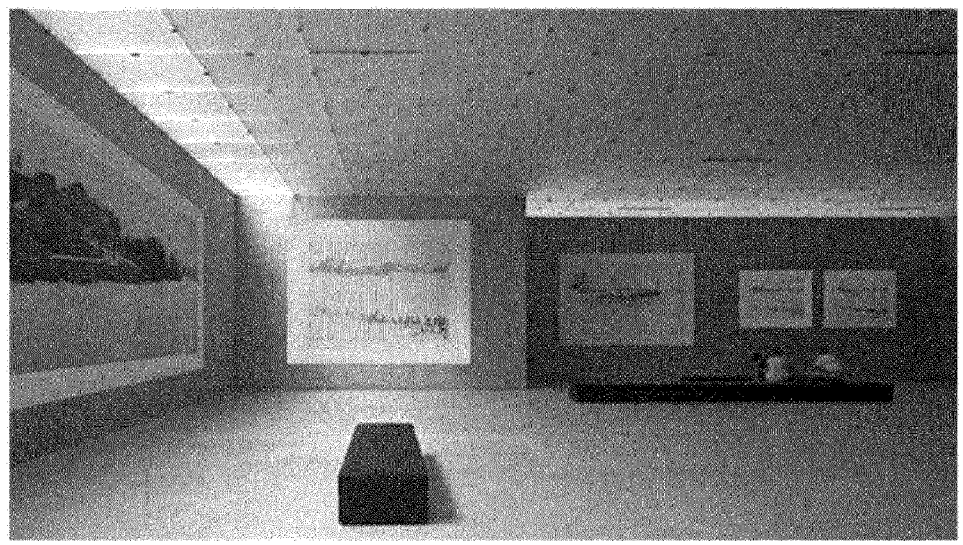
FIGS. 15A and 15B are drawings schematically illustrating an example of an exhibition image generated by a virtual exhibition space providing method according to an embodiment of the inventive concept.
Figure 15B:
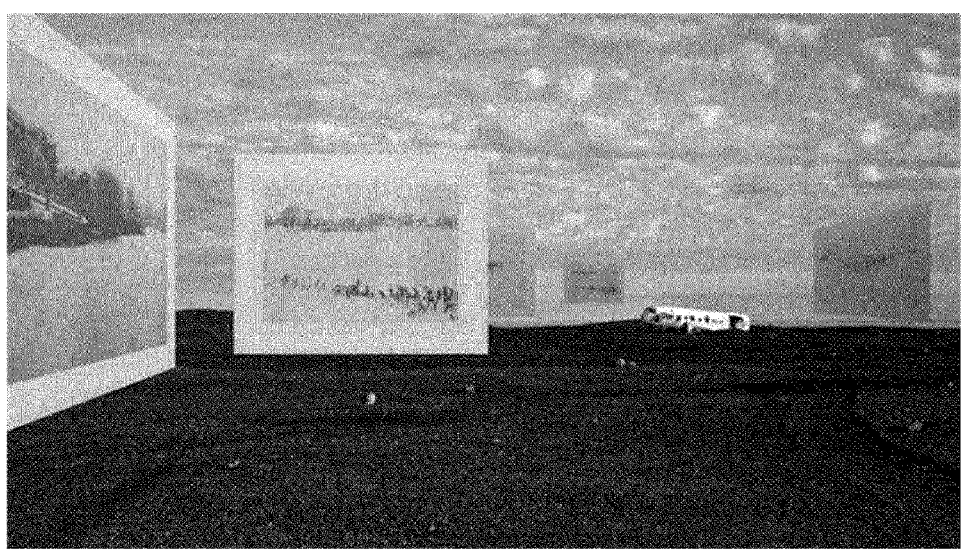

FIGS. 15A and 15B are drawings schematically illustrating an example of an exhibition image generated by a virtual exhibition space providing method according to an embodiment of the inventive concept.

An exhibition image of FIG. 15A may provide a virtual exhibition space similar to a general gallery. An exhibition image of FIG. 15B may provide a virtual exhibition space, which is an outdoor space which is very different from the general gallery and is simultaneously in the form of having a transparent wall surface.

Both the exhibition images of FIGS. 15A and 15B show only a region displayed on a screen of a user terminal 100 of FIG. 1.

A user terminal may include a processor and a memory. The memory may store a computer program configured to be executed by the processor. The computer program may include instructions for executing operations of the method or algorithm described in conjunction with an embodiment of the inventive concept.

Operations of the method or algorithm described in connection with an embodiment of the inventive concept may be directly implemented in hardware (e.g., an application-specific integrated circuit (ASIC)), may be implemented with a software module (e.g., a computer program) executed by hardware, or may be implemented by a combination of the hardware and the software module. The software module may be recorded in a random access memory (RAM), a read only memory (ROM), an erasable programmable ROM (EPROM), an electrically erasable programmable ROM (EEPROM), a flash memory, a hard disc, a removable disc, a CD-ROM, or any type of computer-readable storage medium which is well known in the technical field to which the inventive concept pertains.

Because a snapshot image of a wall surface image where a work image is overlapped and disposed may be generated by the user terminal and is transmitted from the user terminal to the server, an embodiment of the inventive concept may reduce a load of the server which stores and processes a large scale of data.

Furthermore, while the user inputs description information about a work image, because transmission of the work image or the like to the server is performed in the background process, an embodiment of the inventive concept may reduce a time spent to input and transmit data when a work for exhibition is registered.

While a snapshot image is displayed on the screen, because reception of a work image or the like from the server is performed in the background process, an embodiment of the inventive concept may reduce a loading time the user feels when the user views the exhibited work.

According to embodiments of the inventive concept, because a snapshot image of a wall surface image where a work image is overlapped and disposed is generated by the user terminal and is transmitted from the user terminal to the server, the user terminal may reduce a load of the server which stores and processes a large scale of data.

Furthermore, according to embodiments of the inventive concept, while the user inputs description information about a work image, because transmission of the work image or the like to the server is performed in the background process, the user terminal may reduce a time spent to input and transmit data when a work for exhibition is registered.

Furthermore, according to embodiments of the inventive concept, while a snapshot image is displayed on the screen, because reception of a work image or the like from the server is performed in the background process, the user terminal may reduce a loading time the user feels when the user views the exhibited work.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method providing a virtual exhibition space, the method implemented by a computer, the method comprising:
   preparing, by a server, a space image on which an exhibition space having a plurality of empty wall surfaces is expressed in three dimensions, wherein each empty wall surface of the plurality of empty wall surfaces is in a state where a work is not disposed;
   displaying, on a screen of a first user terminal, a portion of the space image with the empty wall surface, wherein the space image is drawn on the screen by linear perspective, in which the space image has a shape where a plurality of one-point perspectives or a plurality of two-point perspectives are integrated and has a plurality of view points and one or more vanishing points corresponding to each of the plurality of view points, and the displayed portion of the space image with the empty wall surface is changed in response to a user input into the first user terminal;
   receiving, by the first user terminal, a selection of a first user for a specific empty wall surface among the plurality of empty wall surfaces on the space image;
   displaying, on the screen of the first user terminal, an empty wall surface image of the specific empty wall surface, wherein the empty wall surface image being where the specific empty wall surface is expressed in two dimensions;
   receiving, by the first user terminal, a command of the first user to overlay and arrange one or more work images at a specific size at a specific location on the empty wall surface image;
   generating, by the first user terminal, a snapshot image of the specific empty wall surface, the snapshot image being where the one or more work images are overlapped and arranged on the empty wall surface image; and
   transmitting, by the first user terminal, identification information of the specific empty wall surface, the snapshot image, and the one or more work images to the server.

2. The method of claim 1, wherein the space image has a shape where a plurality of one-point perspective or a plurality of two-point perspective are integrated.

3. The method of claim 1, wherein the transmitting is performed in a background process while an input including description information about the one or more work images is received from the first user.

4. The method of claim 3, further comprising:
   transmitting the description information about the one or more work images to the server, upon a completion of receiving of the input including the description information about the one or more work images from the first user.

5. The method of claim 1, wherein the transmitting of the identification information of the specific empty wall surface, the snapshot image, and the one or more work images to the server includes:
   transmitting, to the server, the identification information of the specific empty wall surface, and layout information of the one or more work images, wherein the layout information includes the specific location and the specific size, the snapshot image, and the one or more work images.

6. A non-transitory computer readable media having stored thereon a computer program that is executed by the computer for providing the virtual exhibition space by using the method of claim 1.

7. The method of claim 1, wherein the displaying the portion of the space image comprises:
   displaying, on the screen of the first user terminal, a first group of the plurality of empty wall surfaces; and
   in response to the user input to change a view point of the first user, changing the displayed portion of the space image to display a second group of the plurality of empty wall surfaces.

8. The method of claim 1, wherein the receiving the selection comprises:
   receiving, by the first user terminal, a touch input to the specific empty wall surface as the selection of the first user for the specific empty wall surface among the plurality of empty wall surfaces on the space image.

9. The method of claim 1, wherein:
   the two-dimensional empty wall surface image is displayed to occupy an entire display surface of the screen of the first user terminal;
   the two-dimensional empty wall surface image, which is displayed to occupy the entire display surface of the screen of the first user terminal, includes a plurality of areas; and
   each area of the plurality of areas is configured to be overlapped with a respective work image of the one or more work images.

10. A method providing a virtual exhibition space, the method implemented by a computer, the method comprising:
    preparing, by a server, a space image on which an exhibition space having a plurality of empty wall surfaces is expressed in three dimensions, wherein each empty wall surface of the plurality of empty wall surfaces is in a state where a work is not disposed;
    displaying, on a screen of a first user terminal, a portion of the space image with the empty wall surface, wherein the space image is drawn on the screen by linear perspective, in which the space image has a shape where a plurality of one-point perspectives or a plurality of two-point perspectives are integrated and has a plurality of view points and one or more vanishing points corresponding to each of the plurality of view points, and the displayed portion of the space image with the empty wall surface is changed in response to a user input into the first user terminal;
receiving, by the first user terminal, identification information of a specific empty wall surface among the plurality of empty wall surfaces on the space image and a snapshot image, wherein the snapshot image being where the specific empty wall surface is expressed in two dimensions and where one or more works are overlapped on the specific empty wall surface to be arranged and expressed at a specific size at a specific location on the specific empty wall surface;
generating, by the first user terminal, an exhibition image by arranging the snapshot image using a scale against the exhibition space; and
displaying, by the first user terminal, the exhibition image on a screen.

11. The method of claim 10, wherein the space image has a shape where a plurality of one-point perspective or a plurality of two-point perspective are integrated.

12. The method of claim 10, further comprising:
receiving a selection of a second user for the specific empty wall surface among the plurality of empty wall surfaces on the space image; and
displaying the snapshot image on the screen.

13. The method of claim 12, further comprising:
receiving one or more work images from the server,
wherein the receiving of the one or more work images from the server is performed in a background process while displaying the snapshot image on the screen.

14. The method of claim 13, wherein the receiving of the one or more work images from the server further includes:
receiving, from the server, layout information of the one or more work images, wherein the layout information includes the specific location and the specific size, and the one or more work images;
receiving a selection of the second user for a specific work among one or more works on the snapshot image; and
displaying a work image of the specific work on the screen using layout information of the work image of the specific work.

15. The method of claim 14, wherein the receiving of the one or more work images from the server further includes:
receiving, from the server, the layout information of the one or more work images, wherein the layout information further includes description information about the one or more work images, and
wherein the displaying of the work image of the specific work on the screen using the layout information of the work image of the specific work includes:
displaying the work image of the specific work and description information about the work image of the specific work on the screen using the layout information of the work image of the specific work.

16. The method of claim 12, wherein the receiving the selection comprises:
receiving, by the first user terminal, a touch input to the specific empty wall surface as the selection of the first user for the specific empty wall surface among the plurality of empty wall surfaces on the space image.

17. A non-transitory computer readable media having stored thereon a computer program that is executed by the computer for providing the virtual exhibition space by using the method of claim 10.

18. The method of claim 10, wherein the displaying the portion of the space image comprises:
displaying, on the screen of the first user terminal, a first group of the plurality of empty wall surfaces; and
in response to the user input to change a view point of the first user, changing the displayed portion of the space image to display a second group of the plurality of empty wall surfaces.

19. The method of claim 10, wherein:
the two-dimensional snapshot image is displayed to occupy an entire display surface of the screen of the first user terminal;
the two-dimensional snapshot image, which is displayed to occupy the entire display surface of the screen of the first user terminal, includes a plurality of areas; and
each area of the plurality of areas is configured to be overlapped with a respective work image of the one or more work images.

* * * * *